(No Model.)
N. JOHNSTON.
KNOT TRIMMER.
No. 534,887. Patented Feb. 26, 1895.
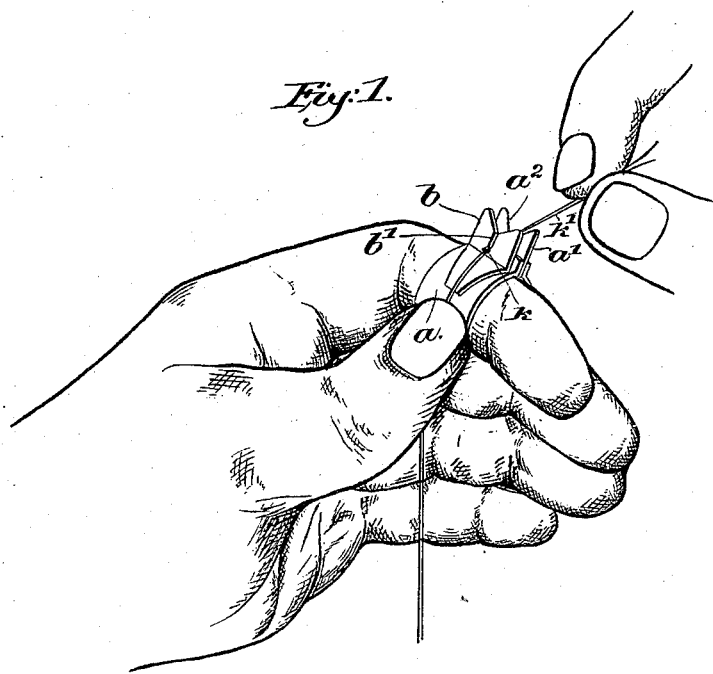
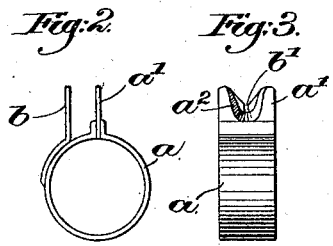
Witnesses.
John F. C. Primlett
Thomas J. Drummond
Inventor.
Nichol Johnston,
by Crosby & Gregory, atty's.
THE NORRIS PETERS CO., PHOTO-LITHO., WASHINGTON, D. C.

UNITED STATES PATENT OFFICE.

NICHOL JOHNSTON, OF MANCHESTER, NEW HAMPSHIRE, ASSIGNOR OF ONE-HALF TO STEPHEN N. BOURNE, OF SAME PLACE.

KNOT-TRIMMER.

SPECIFICATION forming part of Letters Patent No. 534,887, dated February 26, 1895.

Application filed December 20, 1894. Serial No. 532,417. (No model.)

*To all whom it may concern:*

Be it known that I, NICHOL JOHNSTON, of Manchester, county of Hillsborough, State of New Hampshire, have invented an Improvement in Knot-Trimmers, of which the following description, in connection with the accompanying drawings, is a specification, like letters on the drawings representing like parts.

In the operation of spooling yarn breakages are repaired by the attendant, who ties the severed ends of the yarn together. This work is often hastily performed, and the ends of the knot are frequently left so long that later on the knots cause much delay and damage in the weave room by tangling or breaking other yarns. It is most essential that the knots should be tied with the shortest possible ends, and this invention has for its object the production of a knot-trimmer which can be conveniently held and operated by the attendant to quickly cut knot ends to a definite and uniform length.

Figure 1 represents a knot-trimmer embodying the invention, in operative position, the process of cutting the knot ends thereby being clearly illustrated. Fig. 2 is a side elevation of the knot-trimmer detached, and Fig. 3, an edge view thereof showing the cutting blade.

The knot-trimmer is herein shown as comprising a ring or annular support $a$ of suitable size to be held on one of the attendant's fingers, as shown in Fig. 1. A cutter or blade $a'$ is rigidly mounted on the ring $a$, and as herein shown between its ends, though it is obvious that the blade may be secured to the support in any other suitable manner. The cutting edge $a^2$ of the blade is shown as substantially U-shaped to more readily receive the knot ends to be severed. A knot holder $b$, shown as a thin plate erected upon the support $a$ in front of the cutting blade $a'$ and at such a distance therefrom as to determine the length of the knot ends when cut, is inwardly slitted at $b'$ from the apex of its flaring or V-shaped top, which acts as a guide to direct the loose knot ends $k'$ into the slit and prevent the passage of the knot $k$ therethrough, as clearly shown in Fig. 1.

The knot-trimmer is preferably held on the forefinger of the left hand of the attendant, who grasps the tied ends between the forefinger and thumb, the loose knot ends, by a slight movement of the right hand, being drawn down into the slit $b'$ and over the blade $a'$. When the knot $k$ is drawn up against the holder $b$ the ends $k'$ are severed simultaneously by a slight pull across the cutting edge $a^2$ of the blade.

From the foregoing description and illustration it will be apparent that the loose knot ends will all be cut alike, and of a definite length, determined by the distance between the knot holder and cutting blade.

The knot-trimmer can be held on the attendant's finger without interfering in the least with the tying of knots or the performance of other duties, and it is always in position ready for use.

While the support $a$ is herein shown as a complete ring it will be obvious that it may be made of any suitable shape to be held upon the finger.

I claim—

1. A knot-trimmer comprising a support, a slitted knot holder thereon, and an adjacent parallel cutting blade, to sever the ends at a predetermined distance from the knot, when drawn through the slitted holder and against the blade, substantially as described.

2. A knot-trimmer comprising an annular support to be held upon the finger, a slitted knot holder thereon, and an adjacent cutting blade having an edge to receive and sever the knot ends drawn through the knot holder, substantially as described.

3. A knot-trimmer comprising a support, a slitted knot holder having a V-shaped top to guide the knot ends into the slit, and an adjacent U-shaped cutter to receive and sever the knot ends, substantially as described.

In testimony whereof I have signed my name to this specification in the presence of two subscribing witnesses.

NICHOL JOHNSTON.

Witnesses:
 MAUD P. ABBOTT,
 DAVID A. TAGGART.